(12) United States Patent
Sweetland

(10) Patent No.: US 11,951,563 B2
(45) Date of Patent: Apr. 9, 2024

(54) ADDITIVE MANUFACTURING SYSTEM WITH FIXED BUILD PLATE

(71) Applicant: VulcanForms Inc., Waltham, MA (US)

(72) Inventor: Matthew Sweetland, Bedford, MA (US)

(73) Assignee: VulcanForms Inc., Burlington, MA (US)

( * ) Notice: Subject to any disclaimer, the term of this patent is extended or adjusted under 35 U.S.C. 154(b) by 188 days.

(21) Appl. No.: 16/590,877

(22) Filed: Oct. 2, 2019

(65) Prior Publication Data

US 2020/0108465 A1 Apr. 9, 2020

Related U.S. Application Data

(60) Provisional application No. 62/741,836, filed on Oct. 5, 2018.

(51) Int. Cl.
*B23K 26/342* (2014.01)
*B22F 10/28* (2021.01)
(Continued)

(52) U.S. Cl.
CPC ............ *B23K 26/064* (2015.10); *B22F 10/28* (2021.01); *B22F 10/368* (2021.01); *B22F 12/17* (2021.01);
(Continued)

(58) Field of Classification Search
CPC .. B23K 26/342; B23K 26/064; B23K 26/082; B23K 26/702; B23K 26/706;
(Continued)

(56) References Cited

U.S. PATENT DOCUMENTS 10,022,795 B1    7/2018  Redding et al.
11,059,123 B2 *  7/2021  Ackelid .................. B22F 12/00
(Continued)

FOREIGN PATENT DOCUMENTS

CN    108608648 A    10/2018
EP    2 708 297 A2    3/2014
(Continued)

OTHER PUBLICATIONS

International Search Report and Written Opinion for International Application No. PCT/US2019/054285, dated Feb. 7, 2020.
(Continued)

*Primary Examiner* — Justin C Dodson
(74) *Attorney, Agent, or Firm* — Wolf, Greenfield & Sacks, P.C.

(57) ABSTRACT

Disclosed embodiments relate to additive manufacturing systems. In some embodiments, an additive manufacturing system includes a fixed build plate, and a build volume extends above the fixed build plate. A boundary of the build volume may be defined by a powder containing shroud that is vertically displaceable relative to the fixed build plate. A powder deposition system is configured to deposit a powder layer along an upper surface of the build volume and the powder deposition is vertically displaceable relative to the fixed build plate. An optics assembly configured to direct laser energy from one or more laser energy sources towards the build volume, and exposure of the powder layer to the laser energy melts at least a portion of the powder layer. In some embodiments, the build plate may be supported by support columns configured to maintain the build plate in a level orientation throughout a build process.

24 Claims, 12 Drawing Sheets

(51) Int. Cl.
- *B22F 10/368* (2021.01)
- *B22F 12/00* (2021.01)
- *B22F 12/17* (2021.01)
- *B22F 12/20* (2021.01)
- *B22F 12/67* (2021.01)
- *B22F 12/90* (2021.01)
- *B23K 26/064* (2014.01)
- *B23K 26/082* (2014.01)
- *B23K 26/10* (2006.01)
- *B23K 26/70* (2014.01)
- *B33Y 30/00* (2015.01)
- *B33Y 50/02* (2015.01)
- *B22F 10/40* (2021.01)
- *B22F 12/49* (2021.01)

(52) U.S. Cl.
CPC ............. *B22F 12/20* (2021.01); *B22F 12/38* (2021.01); *B22F 12/67* (2021.01); *B22F 12/90* (2021.01); *B23K 26/082* (2015.10); *B23K 26/10* (2013.01); *B23K 26/342* (2015.10); *B23K 26/702* (2015.10); *B23K 26/706* (2015.10); *B33Y 30/00* (2014.12); *B33Y 50/02* (2014.12); *B22F 10/40* (2021.01); *B22F 12/49* (2021.01)

(58) Field of Classification Search
CPC ........ B23K 26/10; B33Y 30/00; B33Y 50/02; B22F 10/20; B22F 1/0085; B22F 2007/042; B22F 3/14; B22F 10/00; B22F 10/28; B22F 2003/1053; B22F 10/30; B22F 12/00; B22F 2203/11; B22F 3/1017; B22F 3/1028; B22F 2003/1042; B22F 12/17; B29C 64/296; B29C 64/295
See application file for complete search history.

(56) References Cited

U.S. PATENT DOCUMENTS

| | | | |
|---|---|---|---|
| 2010/0006228 A1* | 1/2010 | Abe | B29C 64/268 156/356 |
| 2011/0106290 A1 | 5/2011 | Hövel et al. | |
| 2012/0059503 A1 | 3/2012 | Pax et al. | |
| 2013/0101746 A1 | 4/2013 | Keremes et al. | |
| 2014/0363327 A1* | 12/2014 | Holcomb | B22F 10/20 219/76.1 |
| 2015/0021379 A1* | 1/2015 | Albrecht | B29C 64/40 219/76.1 |
| 2015/0276119 A1 | 10/2015 | Booker | |
| 2016/0318253 A1* | 11/2016 | Barnhart | B23K 26/342 |
| 2016/0368050 A1* | 12/2016 | Morris | B22F 12/00 |
| 2016/0368055 A1* | 12/2016 | Swaminathan | B23K 26/16 |
| 2017/0056975 A1 | 3/2017 | Carter et al. | |
| 2017/0120335 A1 | 5/2017 | DeMuth et al. | |
| 2017/0371317 A1 | 12/2017 | Share et al. | |
| 2018/0004192 A1 | 1/2018 | Perret et al. | |
| 2018/0085998 A1* | 3/2018 | von Burg | B29C 64/295 |
| 2018/0154480 A1 | 6/2018 | Bai et al. | |
| 2018/0236549 A1 | 8/2018 | Spears et al. | |
| 2018/0290210 A1* | 10/2018 | Okazaki | B33Y 30/00 |
| 2019/0128419 A1* | 5/2019 | Pieger | B22F 12/222 |
| 2019/0143406 A1 | 5/2019 | Carter et al. | |
| 2020/0001533 A1* | 1/2020 | Packirisamy | B29C 64/141 |
| 2020/0101669 A1* | 4/2020 | Okazaki | B29C 64/245 |
| 2020/0263978 A1* | 8/2020 | Pieger | B33Y 50/00 |

FOREIGN PATENT DOCUMENTS

| | | |
|---|---|---|
| JP | 2010-132960 A | 6/2010 |
| JP | 2015-157420 A | 9/2015 |
| JP | 2017-035873 A | 2/2017 |

OTHER PUBLICATIONS

Invitation to Pay Additional Fees for International Application No. PCT/US2019/054285, dated Dec. 3, 2019.

* cited by examiner

ADDITIVE MANUFACTURING SYSTEM WITH FIXED BUILD PLATE

RELATED APPLICATION

This application claims the benefit under 35 U.S.C. § 119(e) to U.S. Provisional Application Ser. No. 62/741,836, entitled "ADDITIVE MANUFACTURING SYSTEM WITH FIXED BUILD PLATE", filed on Oct. 5, 2018, which is herein incorporated by reference in its entirety.

FIELD

Disclosed embodiments are related to systems for additive manufacturing.

BACKGROUND

In a selective laser melting or metal powder bed fusion processes, one or more incident laser beams are scanned over a build surface that consists of a thin layers of metal powder deposited on a build plate. At the point of irradiation of each laser beam, if the energy of each point is sufficient, the metal powder is heated to the point where the individual powder particles melt and form a molten pool. As each laser point is scanned over a shape on the build surface, the resulting melt pools and melt tracks solidify into a solid metal structure of a desired shape corresponding to the scanned pattern. Once one layer is complete, the build plate on which the powder bed is deposited is typically indexed downwardly and a new layer of fresh metal powder is spread over the build surface. If a melt track on a subsequent surface is scanned over a track a track from the previous scan, the layers are fused together by the melt pool. In this manner, a three-dimensional part can be produced by processing multiple sequential layers.

Both single laser and multi-laser systems are used. Some systems use a pair of galvanometer mounted mirrors to scan each laser beam over the desired pattern on the build surface. Some systems use motion stages to scan the laser over the build surface. Some systems use a combination of motion stages and galvanometers to scan the laser over the build surface. Systems that use galvanometers as part of the scanning method often use f-theta or telecentric lens to help keep the incident angle of the laser beam onto the build surface as close to perpendicular as possible for a given build surface size. The spacing between the final optical component of any laser path (e.g., final optics, galvanometer, mirror, telecentric lens or f-theta lens) may be on the order of a few millimeters up to a hundred or more centimeters.

SUMMARY

In one embodiment, an additive manufacturing system comprises a build plate and a shroud vertically displaceable relative to the build plate. The shroud defines a boundary around a build volume above the build plate. The system further comprises a powder deposition system configured to deposit a powder layer along an upper surface of the build volume, and the powder deposition is vertically displaceable relative to the build plate. The system also comprises an optics assembly configured to direct laser energy from one or more laser energy sources towards the build volume. Exposure of the powder layer to the laser energy melts at least a portion of the powder layer.

In another embodiment, a system for leveling a build surface of an additive manufacturing system a build plate, a base, and a support column extending between the base and the build plate and configured to support at least a portion of a load applied to the build plate. A heater is attached to the support column and configured to heat a portion of the support column.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
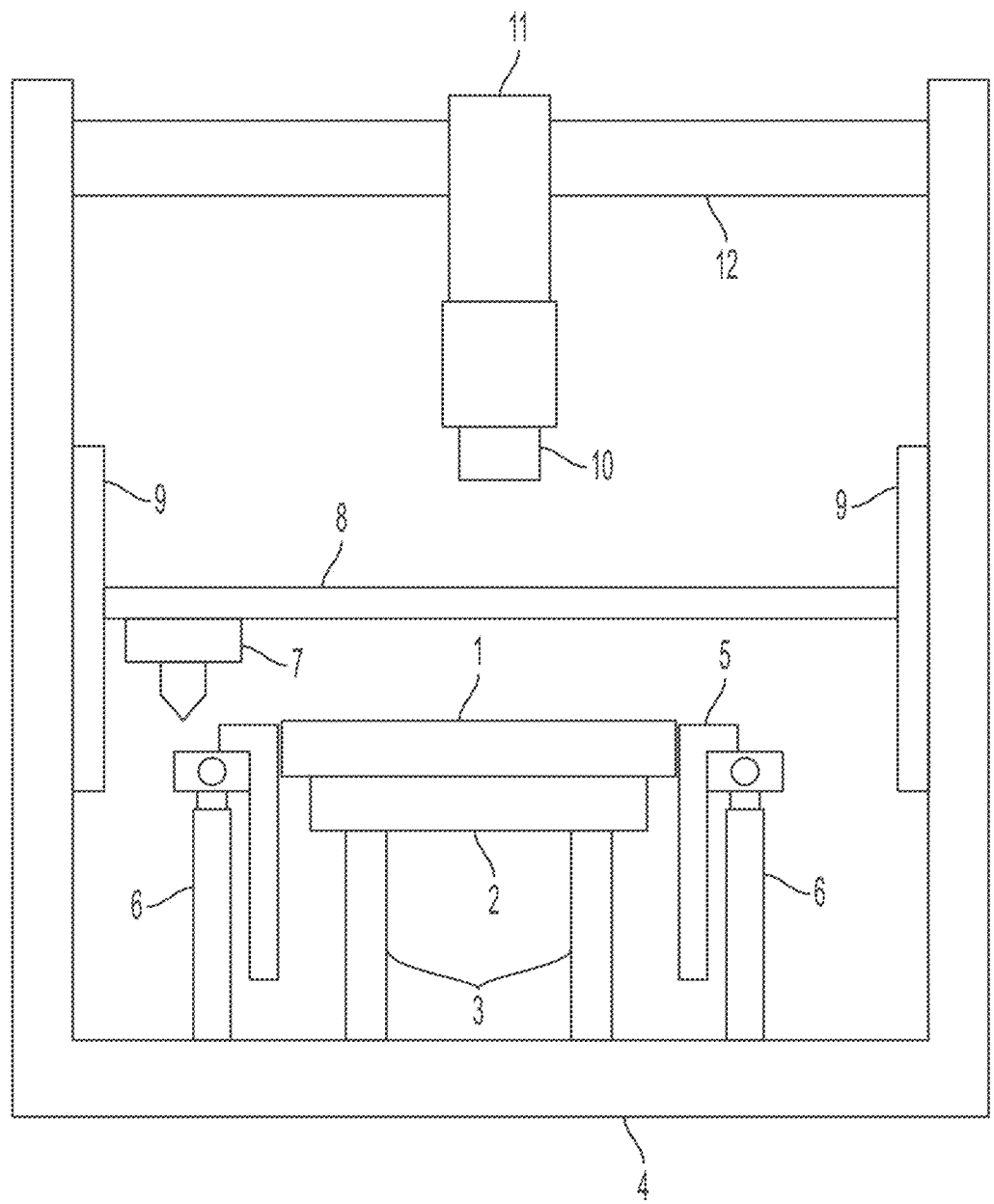
FIG. 1 is a schematic representation of an additive manufacturing system, according to one embodiment.

The inventors have recognized and appreciated that numerous advantages associated with additive manufacturing systems such as selective laser melting or other powder bed fusion systems that allow for precise control over the position of a build surface during a build process. In conventional systems, a build plate surrounded by a fixed powder containment shroud is translated downwardly between processing steps by a step distance corresponding to a thickness of powder layer used for each processing step.

For example, typical step distances range from about 20 μm to about 150 μm based on the powder thickness and layer resolution required for a particular additive manufacturing process. However, the inventors have appreciated that this conventional approach involving moving the build surface between each processing step may not be scalable to systems configured to manufacture larger printed parts due to the increased mass of a completed build associated with increased size of an additive manufacturing machine's print volumes. For instance, in a system configured for manufacturing a steel or stainless part in a 500 mm×500 mm×500 mm print volume, the mass of the print volume may be upwards of 1000 kg at the end of the build process. As another example, a system with a build volume of 1 cubic meter, the print volume mass may be 8000 kg or more. The inventors have recognized that conventional arrangements for controlling the build surface during a build process (e.g., arrangements to index a build plate downwardly between successive processing steps) may not be capable of precisely and accurately moving such large masses by the required step distances. For example, conventional actuator systems for controlling a build surface may not be capable of accommodating the wide range of print volume mass (e.g., 0 kg up to thousands of kg) exerted on the build surface throughout an additive manufacturing process while maintaining an accurate layer thickness on the micron scale for each processing step.

In view of the foregoing, the inventors have appreciated numerous advantages associated with additive manufacturing systems utilizing a fixed build plate in which the other components, such as a powder deposition system (e.g., a powder recoater arrangement), optics unit, and powder containment shroud are arranged to index upwardly relative to the fixed build surface during a build process. For example, such systems may allow for the use of robust support structures for the build plate to support the large range of masses throughout a build process. Moreover, the mass of the movable components may be substantially constant throughout a manufacturing process, which may allow for more accurate and/or precise control of the layer thickness throughout the build process.

In one embodiment, an additive manufacturing system includes a build plate, which may be substantially fixed in place throughout a build process. For example, the build plate may be constructed to define a stationary bottom support surface of a build volume that extends above the build plate. In this manner, the build plate does not index upwardly or downwardly between successive steps of the build process. However, it should be understood that a fixed build plate may undergo some movement during a build process, such as to adjust an orientation of the build plate to maintain the build plate level throughout the build process, as described in more detail below. A shroud is vertically displaceable relative to the build plate to define a boundary around the build volume. For example, the shroud may extend vertically during each step of the build process by a distance corresponding to the powder layer thickness such that the build volume increases throughout the build process. As described in more detail below, the shroud is constructed and arranged to contain a volume of powder and/or portions of a manufactured part within the build volume throughout the build process. A powder deposition system, such as a recoater system or other suitable construction, may be configured to deposit layers of powder along an upper surface of the build volume, and the powder deposition system is vertically displaceable relative to the build plate. The system further includes an optics assembly configured to direct laser energy from one or more laser energy sources towards the build volume. Exposure of the uppermost powder layer in the build volume to the laser energy melts at least a portion of the powder layer (e.g., according to a desired two-dimensional pattern). During the build process sequential layers of a manufactured part may be formed by indexing the shroud and powder deposition system upwardly relative to the fixed build plate by a distance corresponding to the powder layer thickness, and fusing a portion of each sequential layer as desired. In some embodiments, the optics assembly also may be vertically displaceable relative to the build surface, and may be indexed upwardly along with the shroud and powder deposition system between processing steps. In other embodiments, a focal length of the optics unit may be adjusted using optical components while its mechanical mounting remains fixed. Either construction may allow the focal point of the optics assembly to adjust vertically as the build volume extends upwardly above the build plate. In this manner, a three-dimensional part may be built up layer-by-layer from the fixed build plate.

In addition to the above, the inventors have appreciated that a build surface in an additive manufacturing system must be maintained substantially flat and level compared to both an optics unit and a recoater system (or other suitable powder deposition system) throughout a build process. For example, if the build surface is not level to the optics unit, the focal point of the laser(s) may not coincide with the build surface across the entire build surface. Processed powder in the areas that are out of focus of the lasers may not melt properly, which may result in poor mechanical properties of a manufactured part. If the build surface is not level to the recoater system, the powder layers that are processed on the build surface may have variable thickness, which may impact the ability of the layer to be melted during a processing step. For example, if a thickness of some areas of a layer is too large, those areas may not fully melt when scanned with the lasers. This incomplete melting will result in a weak or nonexistent mechanical connection between the processed layer and the build plate (in the case of the first layer deposited on the build plate) or between the processed layer and subsequent layers. Such weak connections can be detrimental for multiple reasons. For example, in the case of the first layer, the weak connections may cause the part to delaminate from the build plate during the build process, which can cause the part to peel away from the build plate and contact the recoater blade during subsequent recoating steps, leading to a failure of the build process. Moreover, weak connections between processed layers may lead to discontinuities within a manufactured part, which can adversely affect the mechanical robustness of the part, and/or lead to failure of the build process.

However, the inventors have appreciated that leveling of the build surface also becomes difficult as the build volume and mass are increased. For example, while multiple actuators mounted under the build plate might be used to adjust the level of the build plate, such arrangements may be undesirable in that they add cost, mechanical complexity and control challenges related to achieving the positioning requirements for the build plate. In some instances, the build plate might be manually shimmed to flat and level, but such an approach would require significant time and effort and can be very difficult and/or dangerous as the build volumes are increased and/or when using a heated build plate, as discussed below. Leveling the build plate at room temperature may be easier, but plate level may be affected when it is heated up to operating temperature. Also, manual shimming requires operator intervention at the build volume level, which may be undesirable in larger machines. For example, most laser based 3D metal printing systems require an inert atmosphere. If operator intervention is required at the build volume level to mount and shim the build plate for each step of a build sequence, the machine volume has to be purged with inert gas (typically Nitrogen or Argon) after the operator intervention and before processing. This purging can be slow and expensive.

According to some aspects, the systems described herein may facilitate automated leveling of a build plate throughout a build process while providing support for a large build volume. For example, and as described in more detail below, in some embodiments, such automated leveling may be achieved via controlled thermal expansion of one or more support columns underlying a fixed build plate. Consequently, the systems described herein may avoid one or more of the above-noted deficiencies of conventional approaches for leveling a build surface.

In addition to the above, the inventors have recognized that heating of a build plate may be advantageous in some instances. For example, as the temperature of the build plate is increased, the induced thermal stress on a manufactured part may be reduced. Also, with some materials, maintaining the build volume above a minimum temperature may aid in improving one or more properties of the manufactured part, such as one or more metallurgical properties. In some instances, build plate operating temperatures ranging from about 150° C. to about 500° C. may be suitable. However, the inventors have also recognized that build plate heating may adversely affect the leveling, flatness, and/or positioning tolerance of a build surface, and that excess heat from the build plate must be contained to prevent thermal conduction from causing undesired heating in other components of the additive manufacturing system.

In view of the above, some aspects described herein may allow for heating of a build plate to a desired temperature while providing required support and/or leveling of the build plate. For example, in some embodiments, a build plate of an additive manufacturing system may be mounted on a fixed plate including a heater. Conduction may cause the temperature of the build plate to track a set temperature of the heated fixed plate. In some embodiments, the fixed plate may be mounted on one or more support columns that carry the mechanical load from the fixed base to a base of the additive manufacturing system. As described in more detail below, a temperature profile along each of the support columns may be individually adjusted, and the resulting thermal expansion and induced thermal stresses in the support columns may be used to level the fixed based and the build surface throughout a build process. Moreover, in some embodiments, a heated fixed base may not be included, as the current disclosure is not limited in this regard. For example, the support columns may be attached directly to the build plate, and the temperature profile along the support columns may be used to bring the build plate to a desired temperature, in addition to facilitating leveling of the build plate.

In one exemplary embodiment, an additive manufacturing system includes a fixed base on which a build plate is mounted. This fixed base is attached to a machine base (i.e., a base or outer casing of the additive manufacturing system) through a set of support structures, such as support columns. A powder containment shroud surrounds the build plate and the fixed base and is vertically displaceable relative to the build and fixed plates. The shroud is supported by actuators such as vertical motion stages that allow the shroud to be vertically displaced relative to the build plate. A recoater system is supported above the build plate and can be vertically displaced relative to the build plate via another set of actuators or motion stages coupled to the recoater system. An optics assembly is mounted over the build plate. Depending on the embodiment, the optics assembly may comprise a galvanometer system that scans laser beams over the build surface, a fixed optics unit mounted on a gantry system that allows the optics unit to be mechanically scanned in a plane over the build surface, and/or a combination of galvanometer system mounted on a moving gantry system. In the case of a fixed optical focal length, the optics unit (galvanometer or gantry system) may be coupled with a vertical motion system that allows the unit to be vertically displaceable relative to the build plate. If the optics unit has a variable focal length from internal optical components, then the optics unit may remain in a fixed vertical position that is sufficiently high such that it doesn't interfere with the highest possible build surface or upper positions of the recoater and shroud system. A combination of adjustable focal length and adjustable optics unit vertical position can also be used in some embodiments, as the current disclosure is not limited in this regard.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts one embodiment of an additive manufacturing system a system in a configuration at the beginning of a build process. The system includes a build plate 1 mounted on a fixed plate 2, which is in turn mounted on vertical supports 3 that attach to a base 4 of the additive manufacturing system. A powder containment shroud 5 is in its lowest position and is support by vertical motion stages 6 that are mounted to the base 4. A powder deposition system in the form of a recoater system 7 is mounted on a horizontal motion stage 8 that allows the recoater system to be moved back and forth over the build plate. The recoater system horizontal motion stage 8 is supported by vertical motion stages 9 that facilitate vertical movement of the recoater 7 relative to the build plate 1. In FIG. 1, the recoater system 7 is shown in its lowest position. An optics unit 10 is supported on a vertical motion stage 11 that is in turn mounted on a gantry system 12 that allows the optics unit to be scanned in the plane of the build plate 1. The optics unit is shown in its lowest position.

Figure 2:
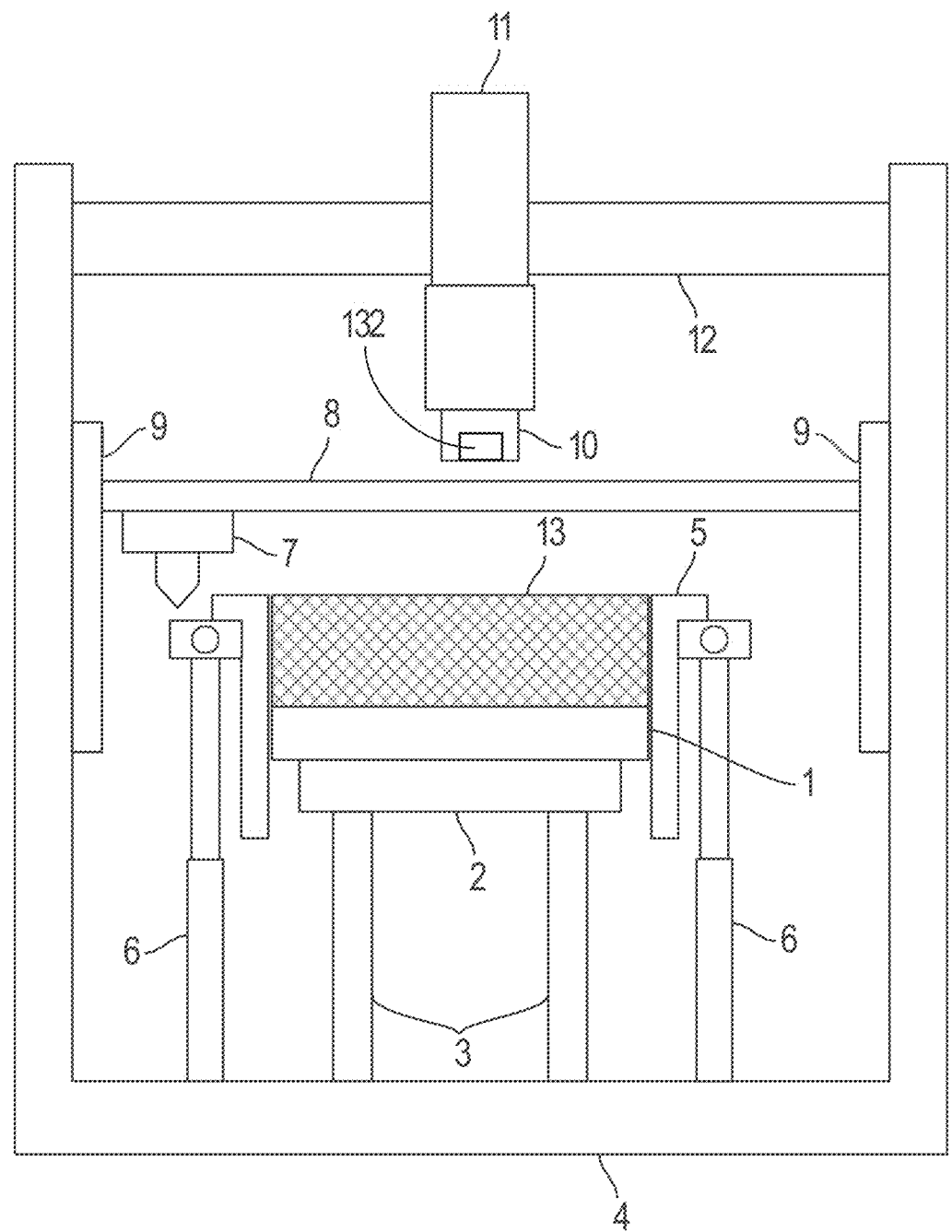
FIG. 2 is a schematic representation of the additive manufacturing system of FIG. 1 in an intermediate position.

FIG. 2 depicts the additive manufacturing system of FIG. 1 in an intermediate configuration part way through the build process. As shown in the figure, the shroud 5, recoater system 7 and optics unit 10 are in an intermediate position along a total vertical length of travel associated with the vertical motion stages 6, 9, and 11, respectively. Extension of the shroud 5 above the build plate 1 defines a build volume 13 above the build plate.

Figure 3:
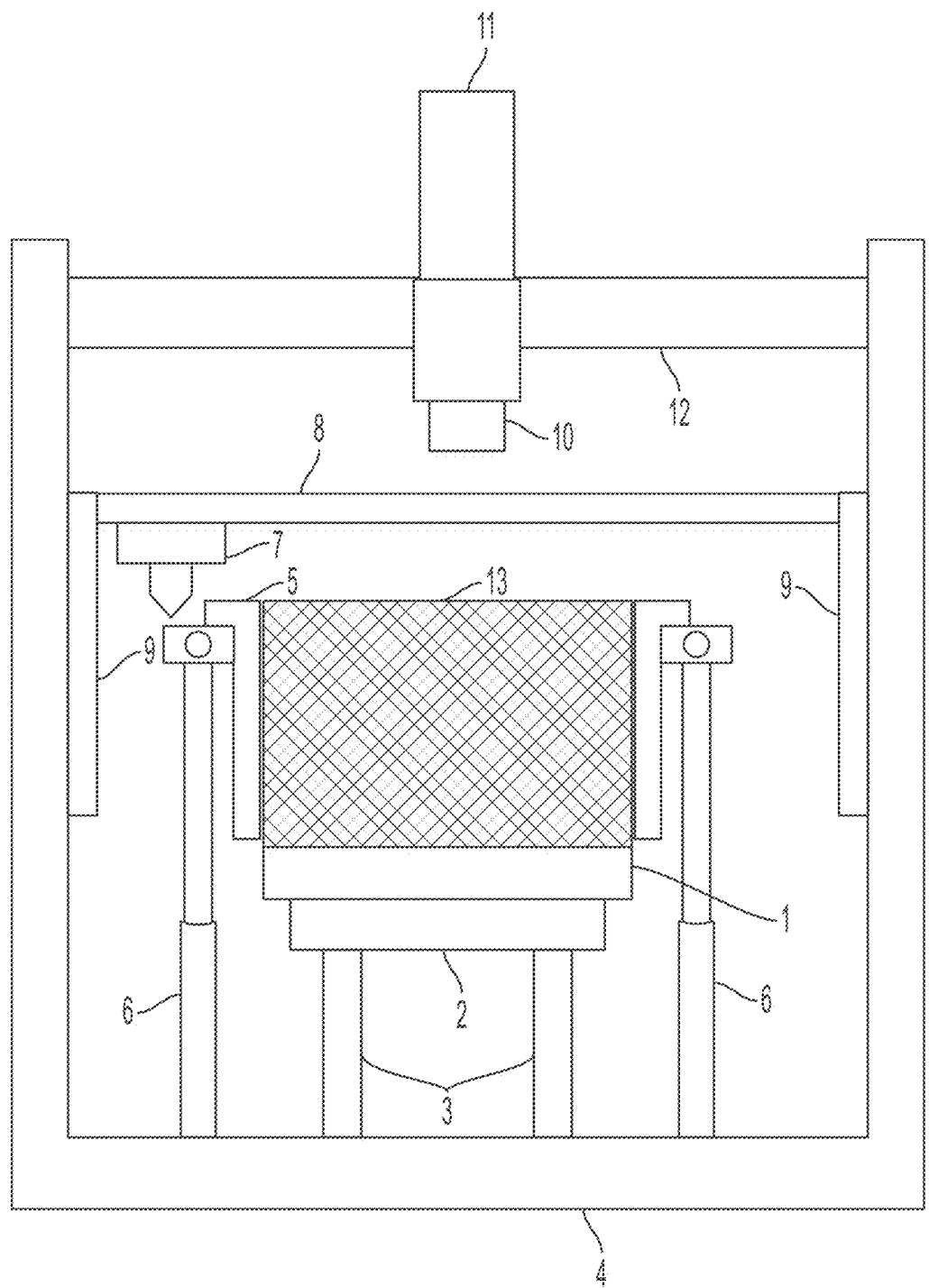
FIG. 3 is a schematic representation of the additive manufacturing system of FIG. 1 in a final position at the end of a build process.

FIG. 3 depicts same system in a configuration corresponding to the end of a build process. In particular, the shroud 5, recoater 7, and optics unit 10 are each in their upper most position relative to the build plate 1, and the build volume 13 has its maximum size. Throughout the build process, the vertical load on each of the vertical motion stages 6, 9, and 11 remains substantially constant as the height of the build volume increases. Moreover, the mass that is moved by each of the vertical stages remains substantially constant. Such a configuration allows each vertical motion system to be tuned and optimized for its specific load without having to account for the changing mass of the build volume as more layers are added in the build process. In this manner, the overall vertical positional accuracy of the system may be maintained even for large build volumes.

In some embodiments, one or more seals may be provided between the build plate 1 and shroud 5 to prevent powder from sifting out of the build volume. For example, the seals may be formed of felt, polymer, rubber, fiber or metallic materials and the seal may be rated to the maximum working temperature of the build and fixed plates. However, it should be understood that a seal may not be included in some embodiments, as the current disclosure is not limited in this regard. For example, contact between the shroud and the perimeter of the build plate may be sufficient to prevent powder from leaving the build volume during the build process. In other embodiments, the shroud may have an extendable construction. For example, a base of an extendable shroud may be attached around a perimeter of the build plate to form a seal that prevents powder from leaving the build volume, and a top of the extendable shroud may be attached to the vertical motion stages to extend the shroud throughout the build process. Accordingly, it should be understood that the current disclosure is not limited to any particular shroud construction or sealing arrangement to contain powder within the build volume during a build process.

Figure 4:
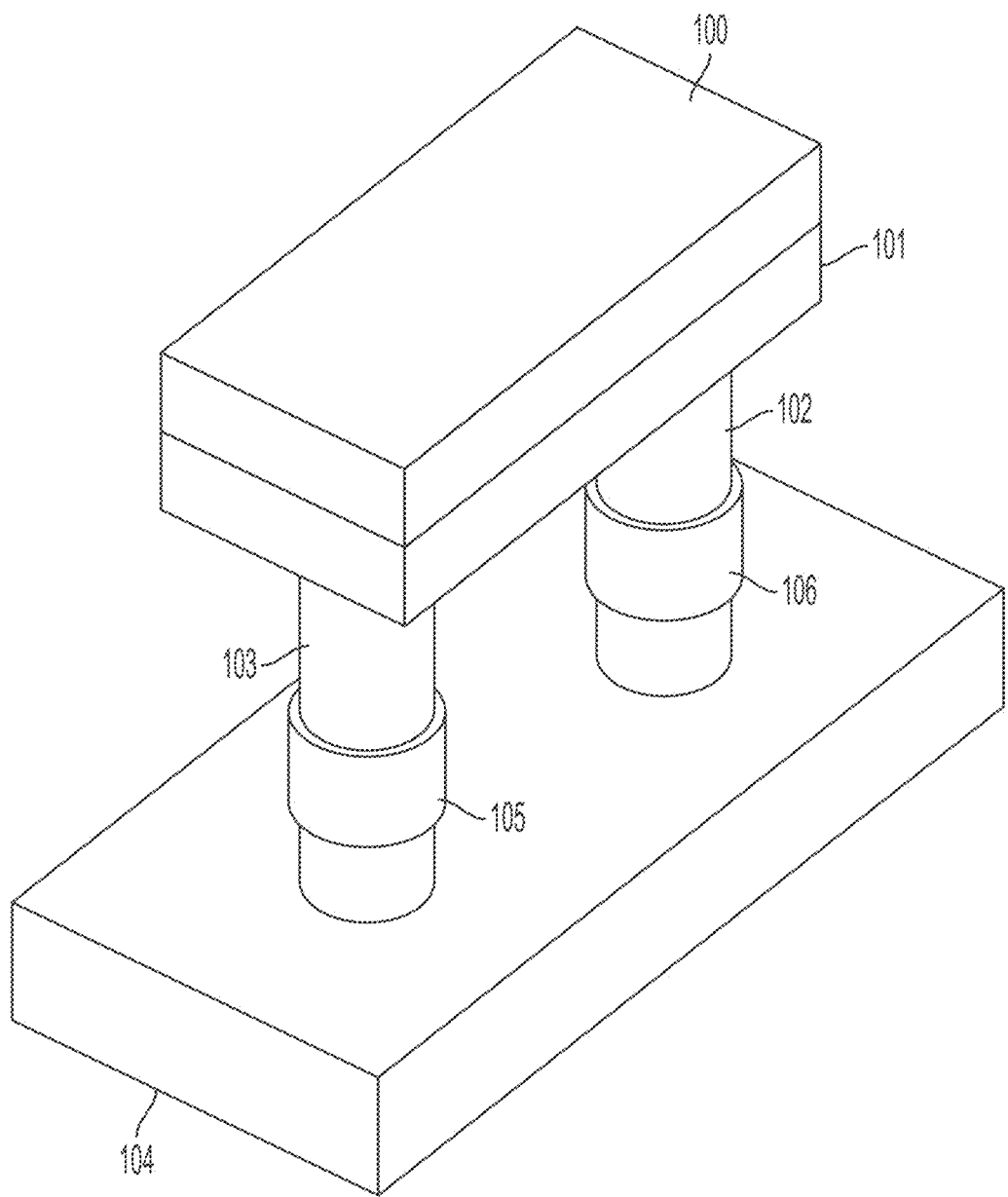
FIG. 4 is a schematic perspective view of a support and leveling system for an additive manufacturing system, according to one embodiment.

As noted above, the support structure for the fixed plate and/or build plate can be used to level the fixed plate and build plate relative to the machine base and other components mounted to the machine base throughout the build process. One exemplary embodiment of such a system is described in more detail in connection with FIGS. 4-5. In particular, FIG. 4 shows a schematic perspective view of a build plate 100 attached to a fixed plate 101. The fixed plate is attached to two support columns 102 and 103 that are mounted and attached to a machine base 104. Each support column has an independently controllable heater 105 and 106, respectively. Each heater may have an associated temperature sensor mounted either inside the heater or in the support column material under the heater. Depending on the particular embodiment, the heaters can have any suitable configuration and/or arrangement, and in some instances, a heater configuration may be selected to match a shape of a support column to which the heater is attached. For example, in some embodiments utilizing a round support column, a band heater such as a mineral insulated band heater or a coiled cable heater. In other embodiments, (e.g., in which the support columns are not round), plate heaters or thin film heaters may be attached to the outer surfaces of the support columns, and/or one or more cartridge-style heaters may be inserted into mounting holes formed in the support columns. Alternatively or additionally, one or more support columns may be at least partially surrounded by one or more external heaters such as induction heating coils. Accordingly, it should be understood that the current disclosure is not limited to any particular type or arrangement of heaters or heating elements.

Figure 5:
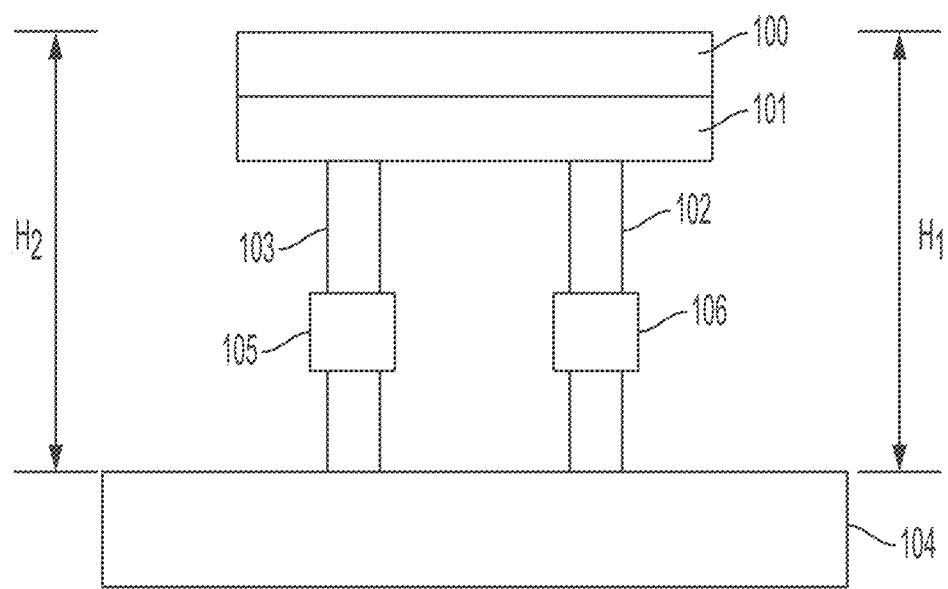
FIG. 5 is a front view of the support and leveling system of FIG. 4.

FIG. 5 shows the same assembly from a front view. Assuming all components start at room temperature, if the height H1 on a first right side of the build plate is less than the height H2 of on second side of the build plate, the temperature of the support column 102 on the first side can be increased using the heater 106 associated with that column. If the average temperature of the support column is increased by some $\Delta T$, then the change in height of H1 can be calculated from $\Delta H_1 = \alpha \cdot \Delta T \cdot H_1$ where $\alpha$ is the thermal coefficient of expansion for the material of support column 102. For example, if the support column consists of a 304 stainless steel rod with an initial length of 100 mm and an average temperature change of 10° C. with an assumed coefficient of thermal expansion of 17.3 µm/m ° C., then the change in length of the support column will be 17.3 µm. If there is no net added stress on the support column, all this expansion will result in shifting the right hand side of the build plate up by approximately 17.3 µm. Accordingly, increasing the average temperature of the support column will yield a vertical motion of the area above that build column at the rate of approximately 1.73 µm/° C. If on initial inspection, the first side of the build plate is lower by, for example, 25 µm compared to the second side, then the support column 102 associated with the first side should be heated to an average $\Delta T$ increase of 14° C. to bring the build plate to a level state.

If the system shown in FIGS. 4-5 and FIG. 5 was allowed to equilibrate for a sufficient period of time, a thermally stable point would be obtained based on the convective and conductive losses of the system. This final thermal profile would determine the actual expansion of the two support columns and the relative expansion between the two columns. Thermal expansion in other parts of the system would also have to be considered to determine the final position of build plate surface relative to the machine base.

Figure 6:
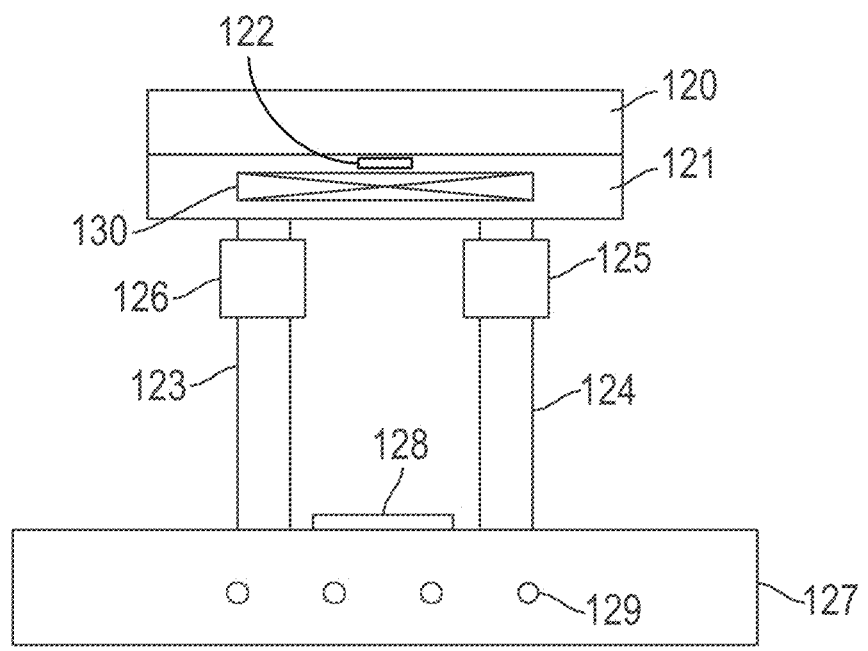
FIG. 6 is a schematic representation of a support and leveling system for an additive manufacturing system, according to another embodiment.

Accordingly, some embodiments may be configured to provide a more controlled thermal state relative to the embodiment shown in FIGS. 4-5, which may improve the ability to drive specific leveling motions. For example, in the embodiment depicted in FIG. 6, a build plate 120 is mounted to the fixed plate 121 which has an embedded heater 402, see FIG. 12, and temperature sensor 122. Support columns 123 and 124 are mounted to the fixed plate and have heaters 125 and 126 that are mounted on the columns at a position closer to the fixed plate 121 than a machine base 127. The support columns are mounted to the machine base 127 which has a cooling plate 128, embedded cooling channels 129, and/or any other suitable cooling structure. The heater embedded in the fixed plate can be used to drive the fixed plate and build plate to a desired temperature, such as an elevated temperature compared to the ambient conditions. The cold plate and/or embedded cooling channels in the machine base can be used as a heat sink to maintain the machine base at a constant temperature even with thermal conduction from and through the support columns. With this construction, the support columns will reach a steady state thermal profile based on the fixed plate temperature, machine base temperature and convective conditions around the support columns. If convection is neglected or minimized by insulation around the columns, then the temperature profile along each column will be approximately linear from the fixed plate temperature to the machine base temperature. Any conductive losses through the support columns will depend on the material properties (thermal conductivity), length and cross sectional area of the support column.

Once the system has reached thermal equilibrium, the surface of the build plate can be measured for level. For example, these level measurements can be obtained using a distance sensor mounted on the optics unit and by taking multiple measurement over the top surface of the build plate before the first layer of powder is deposited by a recoater system or other suitable powder deposition system. Depending on the embodiment the distance sensor can be optical, mechanical and/or electrical and can provide micron level measurements of the build plate surface position compared to the optics unit or other suitable component of the system.

Figure 12:
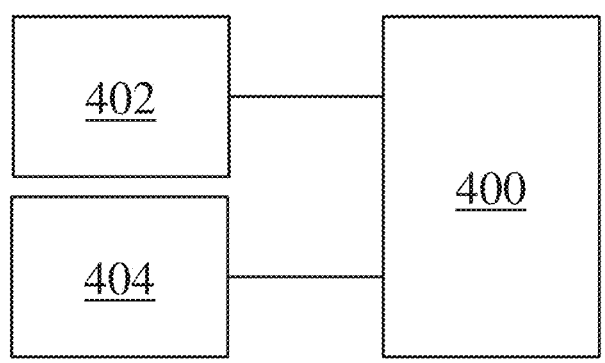
FIG. 12 is a block diagram illustrating the sensors, controller, and heaters of a system, according to one embodiment.

While a distance sensor is described above, it should be understood that the current disclosure is not limited to any particular type of sensor 404, see FIG. 12, to determine an orientation of the build plate and assess whether the build plate is level.

Measurements from a distance sensor or other suitable sensor may be used to adjust the temperatures of the heaters mounted on the support columns. In particular, the change in the temperature profile along each support column will result in a net thermal expansion for each support column, and a thermal expansion for a particular temperature profile along the length of a support column may be approximated as described below in connection with FIGS. 7-8. Based on a net thermal expansion required to level the build surface (e.g., as determined based on measurements from a distance sensor), one or more heaters on the support columns and/or cold plates on the machine base may be controlled to achieve the required temperature profile.

Figure 7:
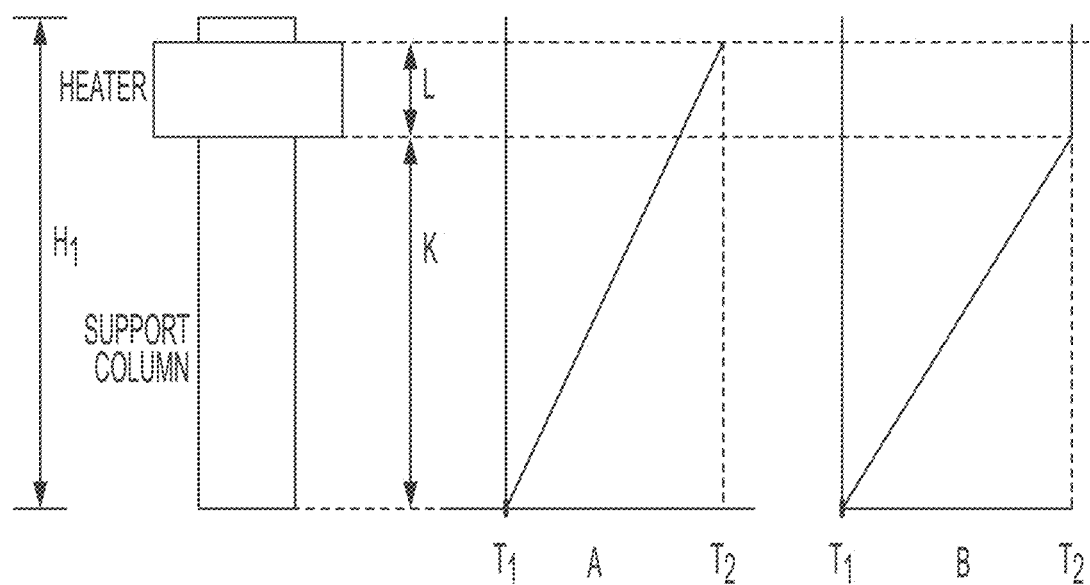
FIG. 7 illustrates temperature profiles along a support column, according to one embodiment.

FIG. 7 schematically illustrates the temperature profile along the length of a support column for two different cases shown in graphs A and B. In particular, graph A shows the temperature profile for a condition where the fixed plate is at a temperature $T_2$ and the machine base remains at a temperature of $T_1$. In this example, the heater is assumed to be turned off and doesn't affect the temperature profile along the support column. The average temperature change of the support column is $\Delta T_{avg} = (T_2 - T_1)/2$ and the change in length from the original cold state can be given by $\Delta H_{1A} = \alpha \cdot \Delta T_{avg} \cdot H_1$. Graph B shows the condition where the heater is positioned close to the fixed plate and where the temperature of the heater is set to be equal to the temperature of the fixed plate. In this example, it is assumed that the support column between the fixed plate and the column heater as well as the material under the heater is raised to the fixed plate temperature $T_2$. In this case, the change in length of the support column from the cold state is given by $\Delta H_{1B} = (\alpha \cdot \Delta T_{avg} \cdot (H_1 - L)) + (\alpha \cdot (T_2 - T_1) \cdot L)$. The difference between $\Delta H_{1A}$ and $\Delta H_{1B}$ represents the height adjustment from setting the temperature of the column heater to the same as the fixed plate temperature. Expanding all terms and simplifying results in a differential expansion between the two cases of $\delta_{AB} = (\alpha \cdot (T_2 - T_1) \cdot L)/2)$. Accordingly, the sensitivity for a given temperature difference between the fixed plate and machine base is determined by the length L of the heater, and using a longer heater yields a greater differential expansion. As an example, a heater having a length of 25 mm with a 304 stainless steel support column and a temperature differential of 200° C. yields a differential expansion of 43 μm. Doubling the length of the heater would double the differential expansion.

Figure 8:
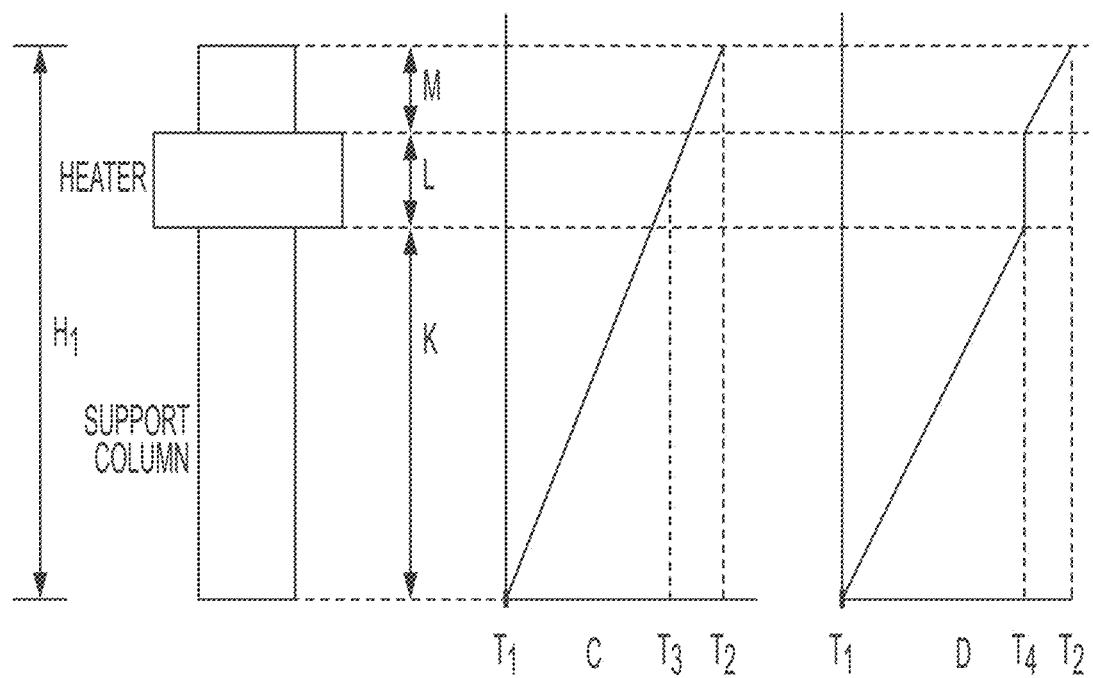
FIG. 8 illustrates temperature profiles along a support column; according to another embodiment.

The analysis discussed above in connection with FIG. 7 demonstrates that both the position and length of the heater determines the sensitivity of the build plate level correction that can be achieved using the systems described herein. A more sensitive adjustment capability can be obtained by moving the heater band position downwardly away from the fixed plate and setting the heater to an intermediate temperature set point. Such a configuration is illustrated in FIG. 8. For the condition where the column heater is off (graph C), the change in the column length from heating the fixed plate can be calculated in the same manner as described above in connection with graph A in FIG. 7, resulting in $\Delta H_{1C} = \alpha \cdot H_1 \cdot (T_2 - T_1)$. As shown in graph C, the column heater is positioned such that the average temperature of the profile under the heater is $T_3$. For the heated example illustrated in graph D in FIG. 8, the heater is set to bring the temperature under the heater to a uniform temperature $T_4$ that is some preset value $\Delta T$ above $T_3$. This configuration can be described by the following equations:

$$T_4 = T_3 + \Delta T$$

$$T_3 = \frac{(K + L/2)}{H_1} \cdot (T_2 - T_1) + T_1$$

$$\Delta H_{1C} = \alpha \cdot \frac{(T_2 - T_1)}{2} \cdot H_1$$

$$\Delta H_{1D} = \alpha \cdot \left\{ \left( \frac{T_4 - T_1}{2} \right) \cdot K + (T_4 - T_1) \cdot L + \left( \frac{(T_2 + T_4)}{2} - T_1 \right) \cdot M \right\}$$

$$\delta_{CD} = \Delta H_{1D} - \Delta H_{1C}$$

The change in length due to thermal expansion from case C to case D, $\delta_{CD}$, is dependent on the $\Delta T$ as well as the geometry factors H, K, L and M. In one example using a 304 stainless steel support column with H=200 mm, K=100 mm, L=50 mm, $T_1$ of 25° C. and $T_2$ of 200° C., $T_3$ would be 134° C. and a $\Delta T$ of 10° C. would yield a $\delta_{CD}$ of 31 μm. This corresponds to a sensitivity of 3.1 μm/° C. This sensitivity can be adjusted even further by adjusting the geometry factors (position of the heater and length of heater) and by changing the support column material to obtain different coefficients of thermal expansion.

Figure 9:
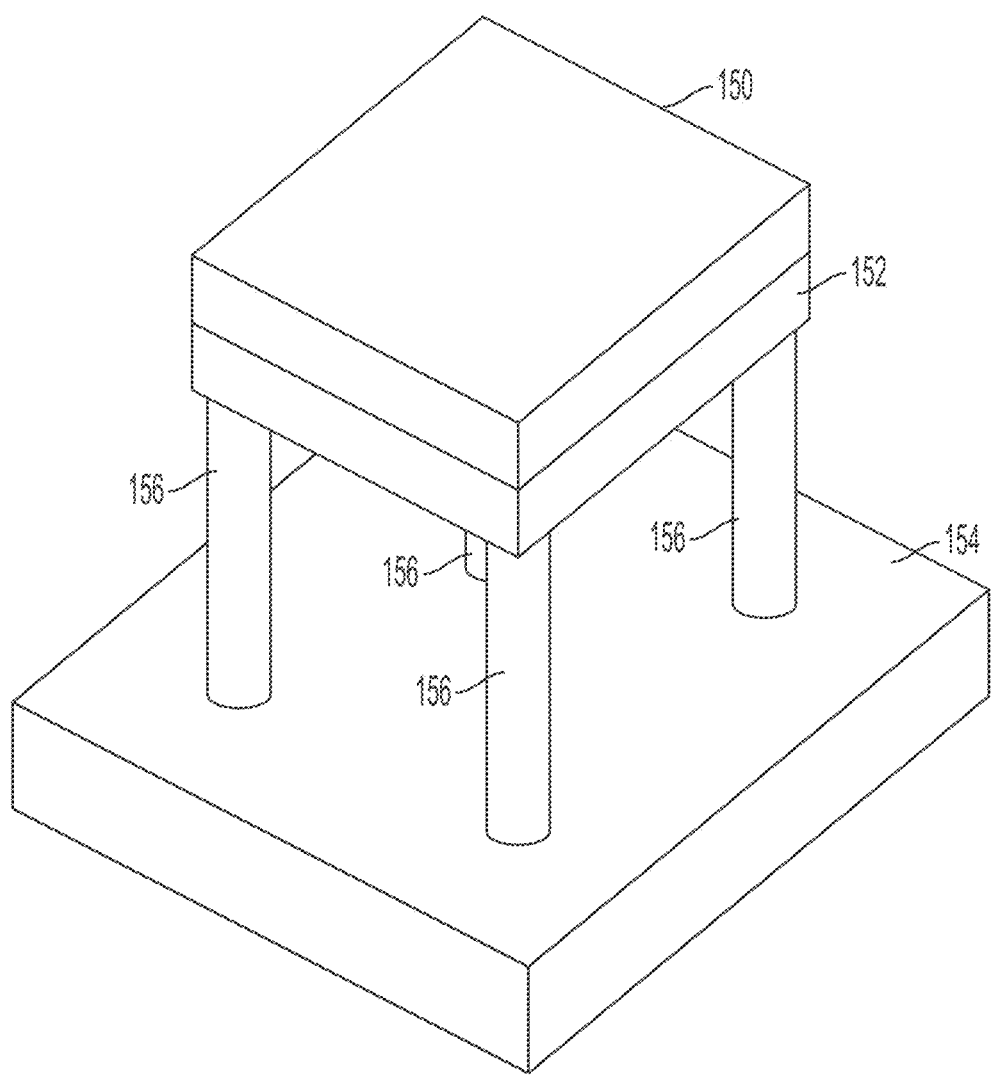
FIG. 9 is a schematic perspective view of a support and leveling system for an additive manufacturing system, according to one embodiment.

It should be understood that the current disclosure is not limited to approximating the net thermal expansion for a particular temperature profile using the above-described model and/or equations. For example, in some instances, the temperature profile along each column may be determined based on all boundary conditions acting on the support columns. Due to the large number of factors that may go into such a calculation, a finite element analysis may be advantageous in providing accurate solution In addition to being able to level two sides of a flat plate, an array of support columns can be used to level build plates across multiple directions of a build plate, such as along width and length dimensions. FIG. 9 shows one embodiment including build plate 150, a fixed plate, 152, and a machine base 154. Four support columns 156 extend between the machine base 154 and the fixed plate 152. In this embodiment, the support columns are arranged in a 2×2 configuration that allows leveling at four points across the build plate 150. Other arrays and configurations of support columns can be used to provide leveling capabilities of build plates of almost any dimension. In some instances, a larger number of support columns with independent thermal controls may increase the number of adjustment points on a given build plate to provide a desired degree of fine tuning of the build plate.

As described above, in some embodiments, one or more support columns may be installed between the fixed plate and the machine base. In other embodiments, one or more support columns may be installed between the fixed plate and an intermediate plate and a secondary set of support columns may be installed between the intermediate plate and the machine base. For example, a build plate that is used in a system with a tall build volume (i.e., a large powder bed build height), the build plate may need to be installed sufficiently high above the machine base such that a full height powder containment shroud can be lowered around the build and fixed plates without contacting the machine base. If this entire height has to be carried by support columns between the fixed plate and machine base, then the support columns may become long enough that designing around buckling load limitations becomes difficult. In this case an intermediate plate configuration may be advantageous.

Figure 10:
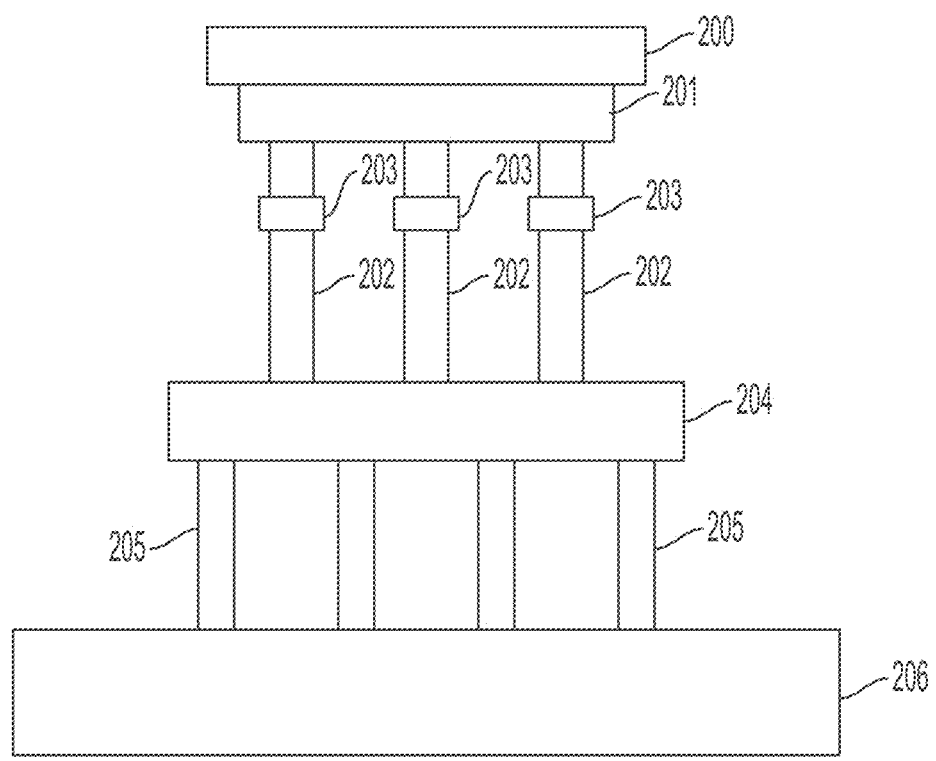
FIG. 10 is a schematic representation of a support and leveling system including an intermediate plate, according to one embodiment.

FIG. 10 depicts one embodiment of a portion of an additive manufacturing system utilizing an intermediate plate. The build plate 200 is mounted on the fixed plate 201, which is supported by multiple support columns 202, each support column having its own heater 203. The support columns are mounted to an intermediate plate 204. The intermediate plate may contain internal cooling channels or may have external cold plates mounted on it. The cooling channels and/or cold plates may aid in keeping the intermediate plate at a fixed temperature. The intermediate plate is mounted on secondary support columns 205. In this embodiment, these secondary columns are not heated and the shape, length and number of secondary columns may not need to match the layout of the support columns between the fixed plate and intermediate plate. The secondary support columns are further mounted onto the machine base. In this manner, the lengths, number and design of the heated support columns can now be optimized for leveling sensitivity and resistance to buckling loads without having to match the total build plate height to the required powder containment shroud motion.

Figure 11:
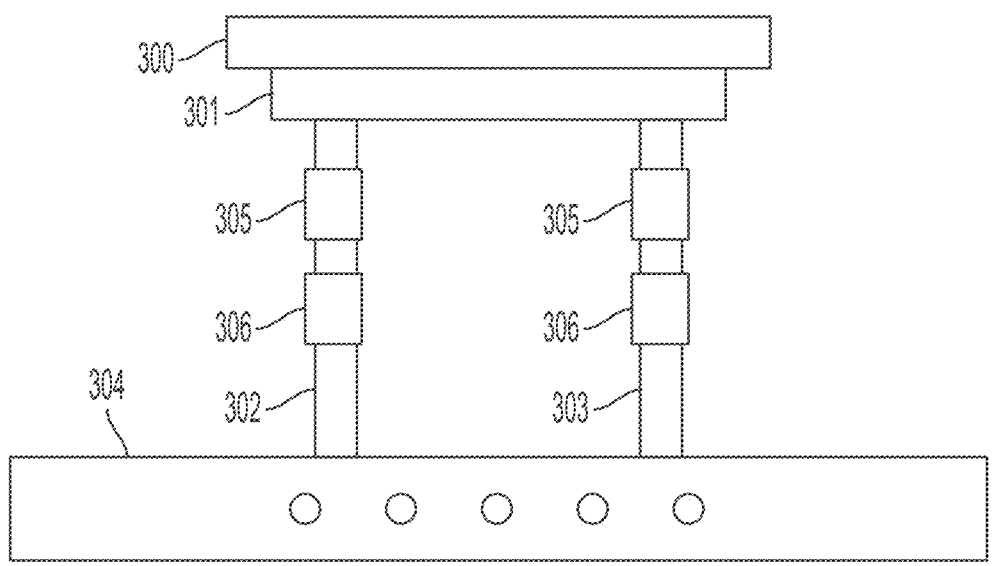
FIG. 11 is a schematic representation of a support and leveling system including multiple heaters on the support columns, according to one embodiment.

FIG. 11 shows an embodiment that includes a build plate 300, a fixed plate 301, and a machine base 304. Two support columns 303 and 304 extend between the machine base and the fixed plate. Two independent heaters 305 and 306 are provided on each support column. In some applications, such a construction may allow for a greater degree of control of the thermal profile along each support column and may be useful in situations with smaller temperature offsets between the fixed plate and machine base and where short support columns may be used. Use of multiple independent heaters per support column provides an increased control sensitivity for using thermal expansion to level the build plate.

In some applications, heated support columns can also be used to compensate for variable loads on the build plate. As the build volume increases with each printed layer, the mass of the accumulated powder and printed parts may eventually start to cause a common compression of all support columns as well as in secondary support columns if they are present in the system. This compression may cause an accumulated height error in a printed part over many layers. This compression can be calculated and compensated for by adding a common thermal offset to all support columns at the same time. For example, in on embodiment, adding 1° C. to all heater support columns per 100 printed layers may be suitable to compensate for this type of variable load.

It should be understood that the heaters described herein may be controlled in any suitable manner. For example, in some embodiments, the various heaters may be operatively coupled to a controller 400, see FIG. 12, configured to automatically adjust a temperature set point of one or more heaters to provide a desired change in length of a support column, for instance, to achieve a desired movement of a portion of a build plate to keep the build plate level during a build process. Such control of the heaters (or other aspects of the additive manufacturing process, such as controlling movement of the shroud, powder deposition system, optical unit, etc.) may be implement in any of numerous ways. For example, some embodiments may be implemented using hardware, software or a combination thereof. When implemented in software, the software code can be executed on any suitable processor or collection of processors, whether provided in a single controller or distributed among multiple controllers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Further, it should be appreciated that a controller may be embodied in any of a number of forms, such as a rack-mounted computer, a desktop computer, a laptop computer, or a tablet computer. Additionally, a controller may be embedded in a device not generally regarded as a computer but with suitable processing capabilities, including a Personal Digital Assistant (PDA), a smart phone or any other suitable portable or fixed electronic device.

Also, a controller may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a controller may receive input information through speech recognition or in other audible format.

Such controllers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a controller, computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Accordingly, while the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An additive manufacturing system comprising:
a build plate vertically supported by two or more support columns, wherein each support column comprises a heater disposed on or in the associated support column;
a powder deposition system configured to deposit a powder layer along an upper surface of the build plate, wherein the powder deposition system is vertically displaceable relative to the build plate;
an optics assembly configured to direct laser energy from one or more laser energy sources towards the build plate, wherein exposure of the powder layer to the laser energy melts at least a portion of the powder layer;
a build plate sensor configured to sense an orientation of the build plate; and
at least one processor operatively coupled to each heater and to the build plate sensor, the at least one processor configured to adjust a length of each support column based at least in part on the sensed orientation of the build plate by independently setting a temperature set point for each heater to adjust a temperature profile along each support column.

2. The additive manufacturing system of claim 1, further comprising a build plate heater operatively coupled to the at least one processor, wherein the at least one processor is configured to set a temperature set point for the build plate.

3. The additive manufacturing system of claim 2, wherein the temperature set point for the build plate is different than at least one temperature set point for the heaters of the support columns.

4. The additive manufacturing system of claim 1, further comprising a powder containment shroud displaceable in a vertical direction relative to the build plate, wherein the shroud extends in the vertical direction from a plane including the build plate, the shroud cooperating with the build plate to define a build volume above the build plate, wherein the shroud extends at least partially around a boundary of the build volume, wherein the build volume is configured to contain a volume of powder, and wherein the shroud is configured to be indexed in the vertical direction during a build process.

5. The additive manufacturing system of claim 1, wherein at least one support column comprises an additional independently adjustable heaters operatively coupled to the at least one processor.

6. The additive manufacturing system of claim 1, wherein the build plate is mounted on a fixed plate underlying the build plate, and each support column is attached to the fixed plate.

7. The additive manufacturing system of claim 1, wherein each support column extends from a base of the additive manufacturing system, the base comprising at least one selected from the group consisting of a cooling plate and cooling channels.

8. The additive manufacturing system of claim 1, wherein each support column extends from an intermediate plate to support the build plate, and further comprising two or more secondary support columns extending between the intermediate plate and a base of the additive manufacturing system.

9. The additive manufacturing system of claim 4, further comprising a seal located around at least a portion of the build plate and configured to engage the shroud to contain the powder within the build volume.

10. The additive manufacturing system of claim 1, wherein the optics assembly is configured to be vertically displaceable relative to the build plate.

11. The additive manufacturing system of claim 4, wherein the optics assembly is configured to be vertically displaceable relative to the build plate, and wherein each of the shroud, the powder deposition system, and the optics assembly are attached to corresponding vertical stages.

12. The additive manufacturing system of claim 1, wherein the powder deposition system comprises a recoater system.

13. The additive manufacturing system of claim 4, wherein the boundary is a side boundary of the build volume extending in the vertical direction from the build plate.

14. The additive manufacturing system of claim 13, wherein a surface of the shroud oriented inwards towards the build volume forms at least a portion of the side boundary.

15. The additive manufacturing system of claim 4, wherein the shroud extends around at least a portion of the build plate.

16. The additive manufacturing system of claim 4, wherein the shroud extends from below the build plate to above the build plate.

17. The additive manufacturing system of claim 1, wherein build plate is configured to be stationary.

18. The additive manufacturing system of claim 4, wherein the build volume is disposed within an interior of the powder containment shroud.

19. The additive manufacturing system of claim 4, wherein a base portion of the shroud is attached around at least a portion of a perimeter of the build plate to form a seal between the shroud and the build plate, and wherein a top portion of the shroud is attached to one or more actuators to extend the shroud throughout the build process.

20. The additive manufacturing system of claim 1, wherein the heaters are disposed on the support columns.

21. The additive manufacturing system of claim 1, wherein the heater extends at least partially around a circumference of the associated support column.

22. The additive manufacturing system of claim 1, wherein the heaters are positioned closer to the build plate than to a base of the additive manufacturing system.

23. The additive manufacturing system of claim 1, wherein the at least one processor is configured to adjust the length of each support column in response to the build plate sensor sensing that the sensed orientation of the build plate is different than a level orientation.

24. The additive manufacturing system of claim 1, wherein the at least one processor is configured to move the build plate toward a level orientation based at least in part on the sensed orientation of the build plate by, for each support column, calculating a change in length for the support column and setting the temperature set point for the associated heater to produce the calculated change in length.

* * * * *

UNITED STATES PATENT AND TRADEMARK OFFICE
CERTIFICATE OF CORRECTION

PATENT NO. : 11,951,563 B2
APPLICATION NO. : 16/590877
DATED : April 9, 2024
INVENTOR(S) : Matthew Sweetland Page 1 of 1

It is certified that error appears in the above-identified patent and that said Letters Patent is hereby corrected as shown below:

In the Claims

At Column 14, Claim 5, Line 34, "heaters" is hereby replaced with --heater--.

Signed and Sealed this
Twenty-first Day of May, 2024

Katherine Kelly Vidal
*Director of the United States Patent and Trademark Office*